United States Patent [19]
Read

[11] Patent Number: 4,542,507
[45] Date of Patent: Sep. 17, 1985

[54] APPARATUS FOR SWITCH PATH VERIFICATION

[75] Inventor: Edgar L. Read, Carrollton, Tex.

[73] Assignee: Honeywell Inc., Phoenix, Ariz.

[21] Appl. No.: 490,009

[22] Filed: Apr. 29, 1983

[51] Int. Cl.[4] .............................................. G06F 11/04
[52] U.S. Cl. ......................................... 371/22; 371/8; 370/13
[58] Field of Search ...................... 370/13; 371/22, 25, 371/8

[56] References Cited

U.S. PATENT DOCUMENTS

| | | | |
|---|---|---|---|
| 3,790,769 | 2/1974 | Ziegler | 371/22 |
| 3,891,838 | 6/1975 | Herr et al. | 371/22 X |
| 4,146,749 | 3/1979 | Pepping et al. | 370/13 |
| 4,402,082 | 8/1983 | Cope | 371/22 |
| 4,417,337 | 11/1983 | Favin et al. | 371/22 |

OTHER PUBLICATIONS

J. Cholat-Namy, Local Loop Test for Multiport Modems, IBM Technical Disclosure Bulletin, 4/80, p. 4956, vol. 22, No. 11.

Beck, An Automated Tester for STD Trunks, Siemens Review XLII, No. 7, Jul. 1975, pp. 285-288.
Bax, 140 Mb/s Coaxial Transmission System 8TR 609, Philips Telecommunications Review, vol. 37, No. 3, Aug. 1979, pp. 144-160.

*Primary Examiner*—Jerry Smith
*Assistant Examiner*—M. Ungerman
*Attorney, Agent, or Firm*—A. A. Sapelli; J. S. Solakian; L. J. Marhoefer

[57] ABSTRACT

The present invention relates to an apparatus for verifying a data path through a digital switch between a transmitting port and a receiving port. The apparatus comprises a transmitter which transmits a test data block in a first predetermined time slot which corresponds to the time slot associated with the transmitting port. A receiver receives the test data block in a second predetermined time slot, which corresponds to the time slot associated with the receiving port. Test logic examines the received test data block to determine that the test data block has been transmitted error-free through the digital switch thereby verifying the data path.

7 Claims, 15 Drawing Figures

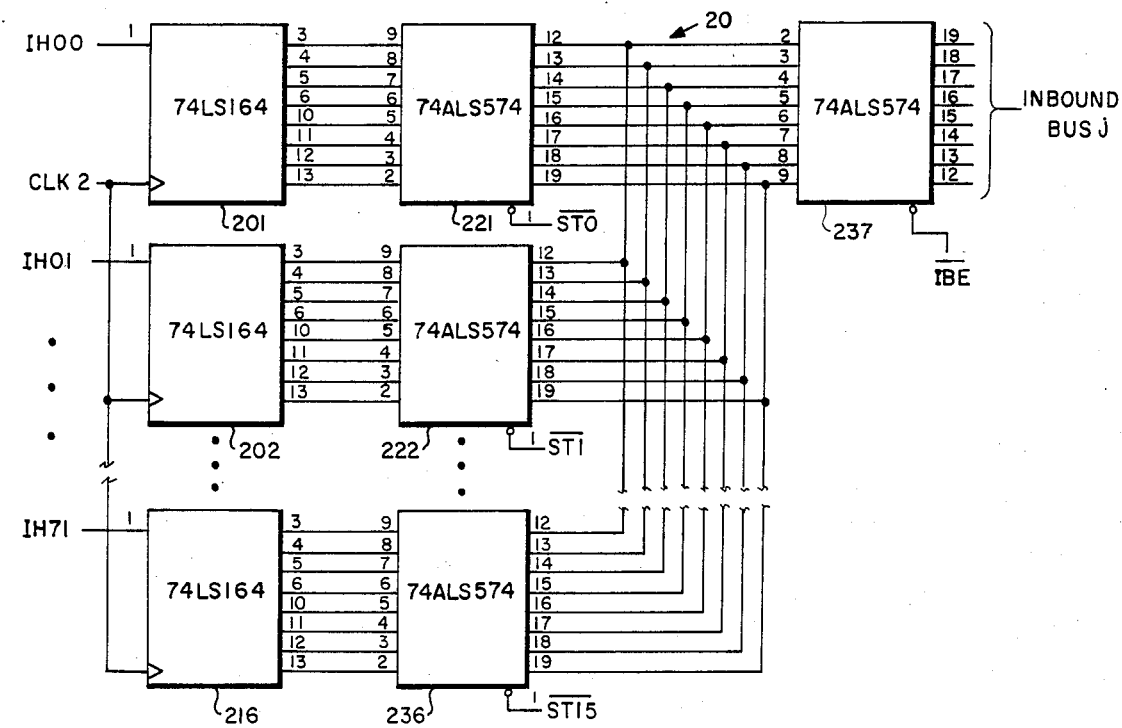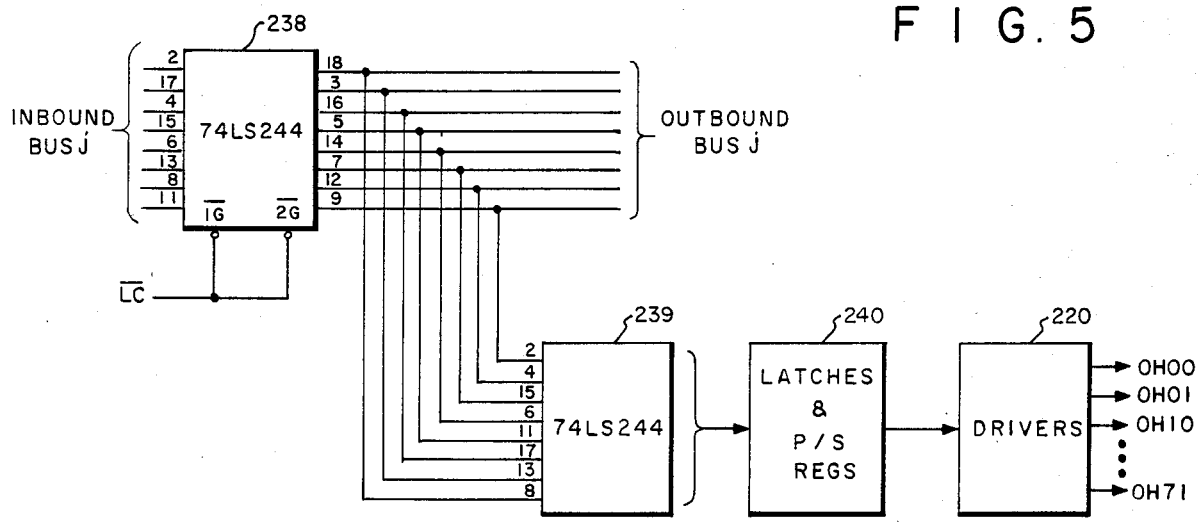
FIG. 5
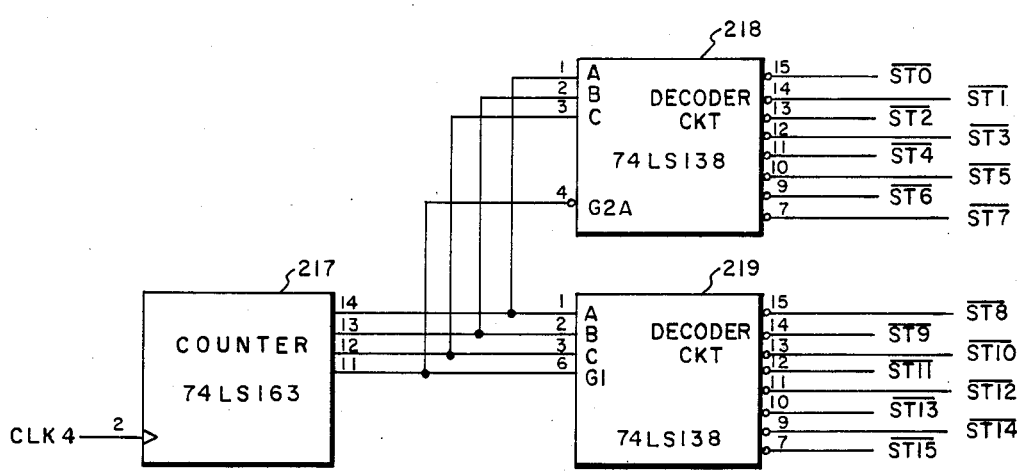

FIG. 9

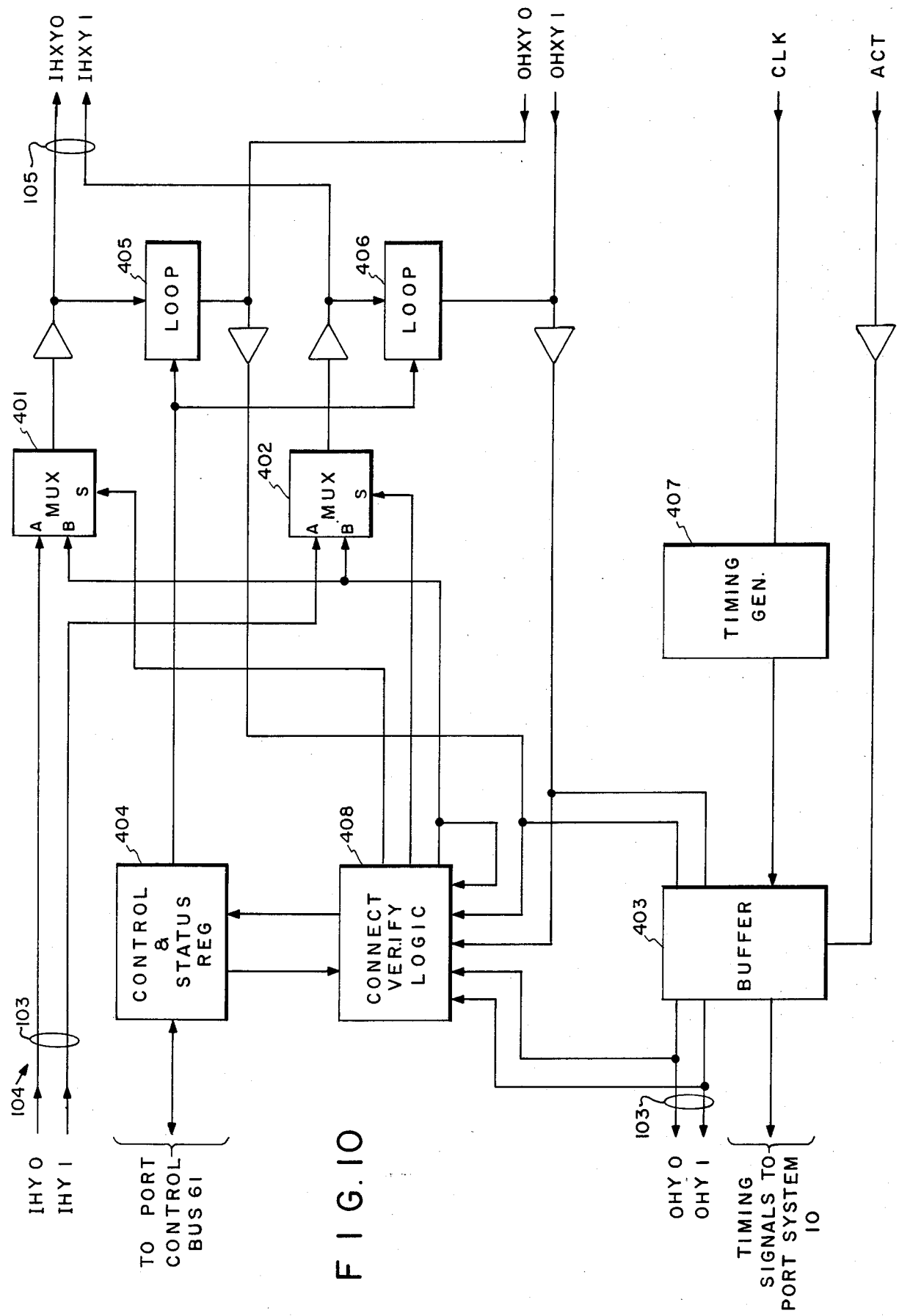

APPARATUS FOR SWITCH PATH VERIFICATION

RELATED APPLICATIONS

The present application is related to U.S. patent application, Ser. No. 490,006, entitled "One-for-N Redundancy in a Digital switch Matrix", by Larry Read, filed on even date herewith, and U.S. patent application, Ser. No. 490,007, entitled "Data Transmission System", by Larry Read, filed on even data herewith, both related applications assigned to Honeywell Inc., the assignee of the present application, and are incorporated by reference heren.

BACKGROUND OF THE INVENTION

This invention relates to a digital switching matrix of a telephone system, and more particularly, to an apparatus for verifying the various paths of the digital switching system.

In telephone systems many data paths, also referred to as data links or links, can exist between an origin point and a destination point. In present day systems, the digital switching logic of the telephone systems can be complex as well as large in size. When a failure occurs in the system, the trouble shooting effort can be painstaking and difficult. In order to detect failures or potential trouble areas early, preventive maintenance procedures are employed. Preventive maintenance techniques involve verifying equipment on a periodic basis and in the case of digital switching systems, involve verifying the various data paths of the system. Prior systems provide the path verification technique in an off-line mode and is not an automatic function. Further, path verification of the prior systems require human intervention for performing the verification test.

Therefore, there exists a need for providing data path verification of a digital switch in an on-line mode.

SUMMARY OF THE INVENTION

Therefore, there is provided by the present invention an apparatus for data path verification in an on-line mode. The apparatus verifies a data path between a transmitting port and a receiving port. The apparatus comprises a first element for transmitting a test data block in a first predetermined time slot, the first predetermined time slot corresponding to the time slot associated with the transmitting port. A second element receives the test data block in a second predetermined time slot, the second predetermined time slot corresponding to the time slot associated with the receiving port. A third element examines the received test data block to determine that the test data block has been transmitted error-free thereby verifying the data path.

Accordingly it is an object of the present invention to provide an apparatus for data path verification.

It is another object of the present invention to provide an apparatus for data path verification of a digital switching system.

It is still a further object of the present invention to provide an apparatus for on-line data path verification.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 5 shows a logic diagram of the preferred embodiment of the transfer logic of the switch I/O subsystem;

FIG. 8 which includes

FIG. 9 shows the contents of eight data RAMS for all eight switch subsystems for the discussed example;

FIG. 10 shows a functional block diagram of a highway select unit of the preferred embodiment of the present invention; and FIG. 11, which includes

DETAILED DESCRIPTION

Figure 1:
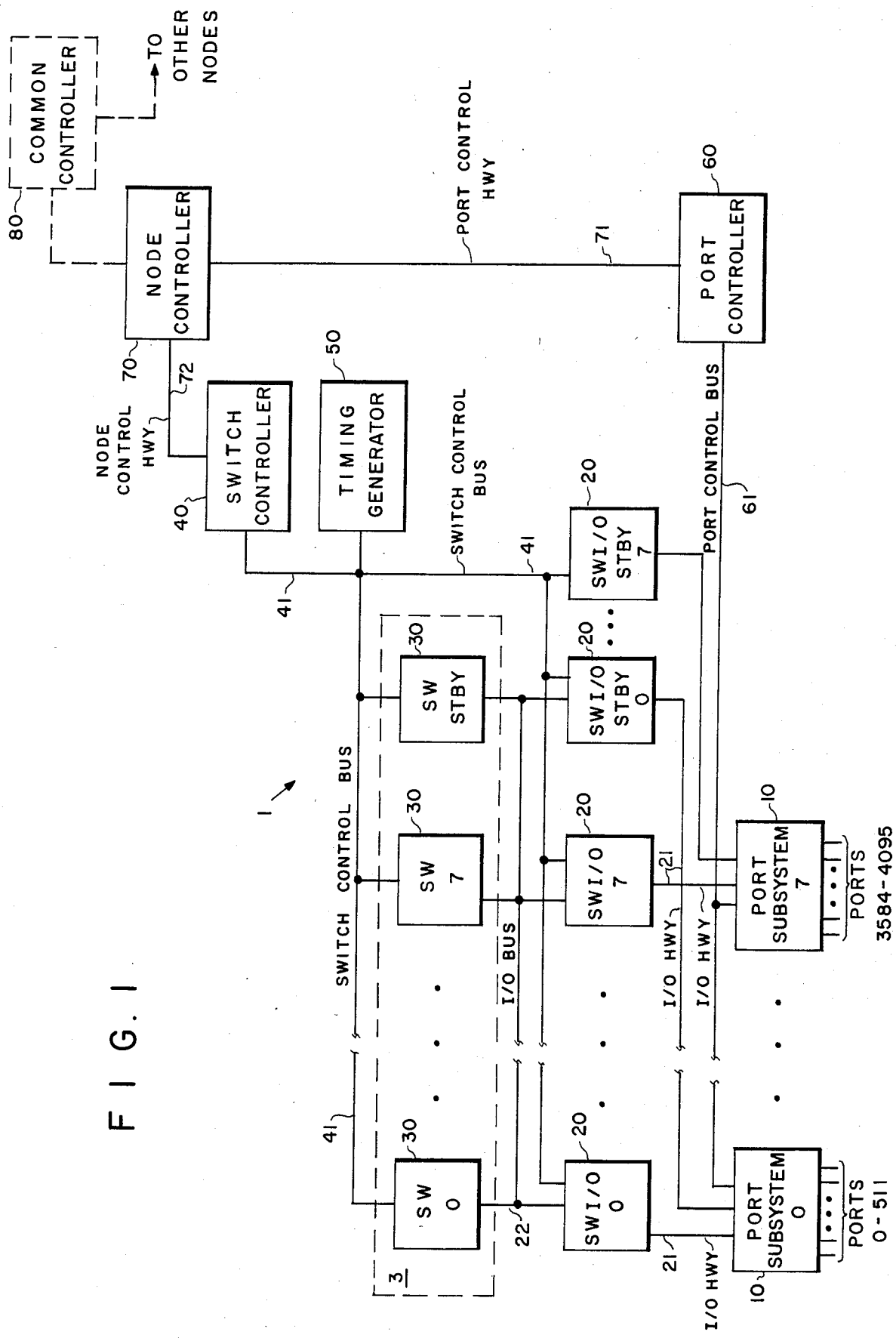
FIG. 1 shows a block diagram of a digital switch system.

Referring to FIG. 1, there is shown a block diagram of a digital switch system 1 of the preferred embodiment of the present invention. In the digital switch system 1, one of a plurality of ports is to be linked to another port for the transfer of information therebetween. Each of the plurality of ports is associated with a port subsystem 10, each port subsystem 10 having 512 ports, and further each port having a unique identifier, i.e., a number. In the preferred embodiment, eight port subsystems 10 are provided, each having 512 ports, resulting in a 4096-port digital switch system 1. Each port subsystem 10 is coupled to an associated switch I/O (SW I/O) 20 via an I/O highway (I/O HWY) 21. Further, each port subsystem 10 is coupled to a corresponding standby (STBY) switch I/O 20 via I/O highway 21. Each switch I/O 20 translates incoming serial data from I/O highway 21 into a parallel format and places the parallel data on an I/O bus 22 for transmission to a switch subsystem 3. Parallel data from the switch subsysem 3 is reformatted by the SW I/O 20 into serial data for transmission to the proper port subsystem 10, thereby completing the desired link. Switch subsystem 3 comprises a plurality of switches, the configuration of the preferred embodiment containing switch (SW) 0 through switch 7 each corresponding with a respective SW I/O 20 and also including a standby switch (SW STBY) 30. In a "normal" configuration, switch 0 through switch 7 and corresponding SW I/O 0 through SW I/O 7 are active, providing the logic to support the 4096 ports. The STBY switch 30 and associated STBY SW I/O 20 (there is a standby switch I/O corresponding to each primary switch I/O) can be made to replace any of the switches 0 through 7 in the event of an error or for verification of the link (also referred to herein as path or data path). The substitution of the STBY SW 30 and associated STBY SW I/O 20 for any of the switches 9 through 7 (and corresponding SW I/O 0 through 7) is controlled by a switch controller 40 coupled to each SW 30 and each SW I/O 20 via a switch control bus 41. Timing and clocking signals (CLK and SYN) are provided by a timing generator 50 which is operatively coupled to the switch control bus 41. A hierarchial control architecture is implemented in the preferred embodiment of the digital switch system 1. A port controller 60 interfaces with the port subsystems 10 via a port control bus 61 which provides control of the ports and reports status information to node controller 70, the node controller 70 being operatively coupled to port controller 60 via a port control highway 71. The node controller 70 maintains the status of the port controllers and provides the overall control of the node, which includes providing control information to switch controller 40 via node control highway 72. The highest level of control in the digital switch system 1 hierarchy resides in a common controller 80 which interfaces with node controller 70. The common controller 80 can also include interfacing to other nodes. System status information is passed between the various controllers of the system, thereby allowing each controller to coordinate its control function in the overall system operation. Switch controller 40 and port controller 60 are implemented in the preferred embodiment utilizing an Intel 8088 microprocessor, and the node controller 70 is implemented in the preferred embodiment utilizing an Intel 8086 microprocessor. The common controller 80 of the preferred embodiment is implemented utilizing a Data General NOVA IV minicomputer. Each of the subsystems mentioned above will be discussed further hereinunder. Although the preferred embodiment of the digital switch system 1 is implemented via the groupings discussed above, for example, eight port subsystems 10 with each port subsystem 10 having 512 ports, it is to be understood by one skilled in the art that different groupings can be made without departing from the true spirit and scope of the present invention. Further, the control architecture can be implement utilizing many alternative configurations, including a variety of combinations of distributed control hierarchy, including a variety of different microprocessors or minicomputers, without departing from the true spirit and scope of the present invention.

Figure 2:
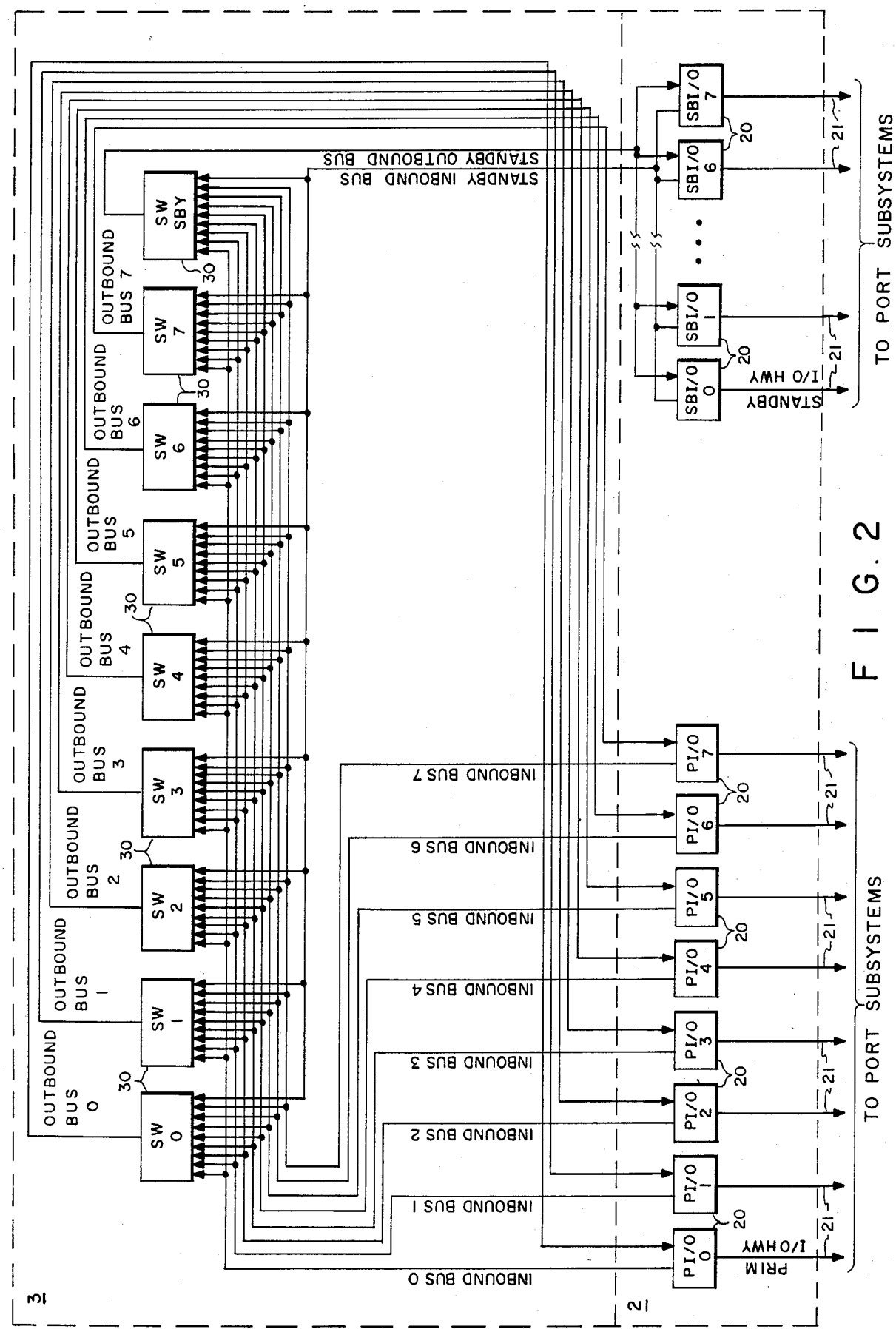
FIG. 2 shows a functional block diagram of the preferred embodiment of a switch I/O subsystem interfacing with a switch subsystem utilized in the digital switch system of FIG. 1.

Referring to FIG. 2, there is shown a functional block diagram of the preferred embodiment of switch subsystem 3 and switch I/O subsystem 2. Switch I/O subsystem 2 comprises a plurality of switch I/Os 20, namely SWIO ∅-SWIO 7 (also denoted herein as primary I/O PIO), and a plurality of standby switch I/Os, namely SBIO ∅-SBIO 7. Each PIO 20 and each SBIO 20 is operatively connected to a corresponding port subsystem 10 via primary I/O highway (PRIM I/O HWY 21) and standby I/O highway (STANDBY I/O HWY) 21, respectively. As mentioned above, switch subsystem 3 comprises a plurality of switches 30, namely SW∅-SW7, and standby switch SWSBY. Each PIO 20 has an inbound bus which is operatively connected to each switch 30. Each switch 30 has an outbound bus operatively connected to a corresponding PIO 20. Each standby SBIO 20 is coupled to a standby inbound bus which is coupled to each switch 30. Likewise, the output of standby switch SWSBY 30 is coupled to each standby switch I/O, SB I/O, via a standby outbound bus.

Figure 3:
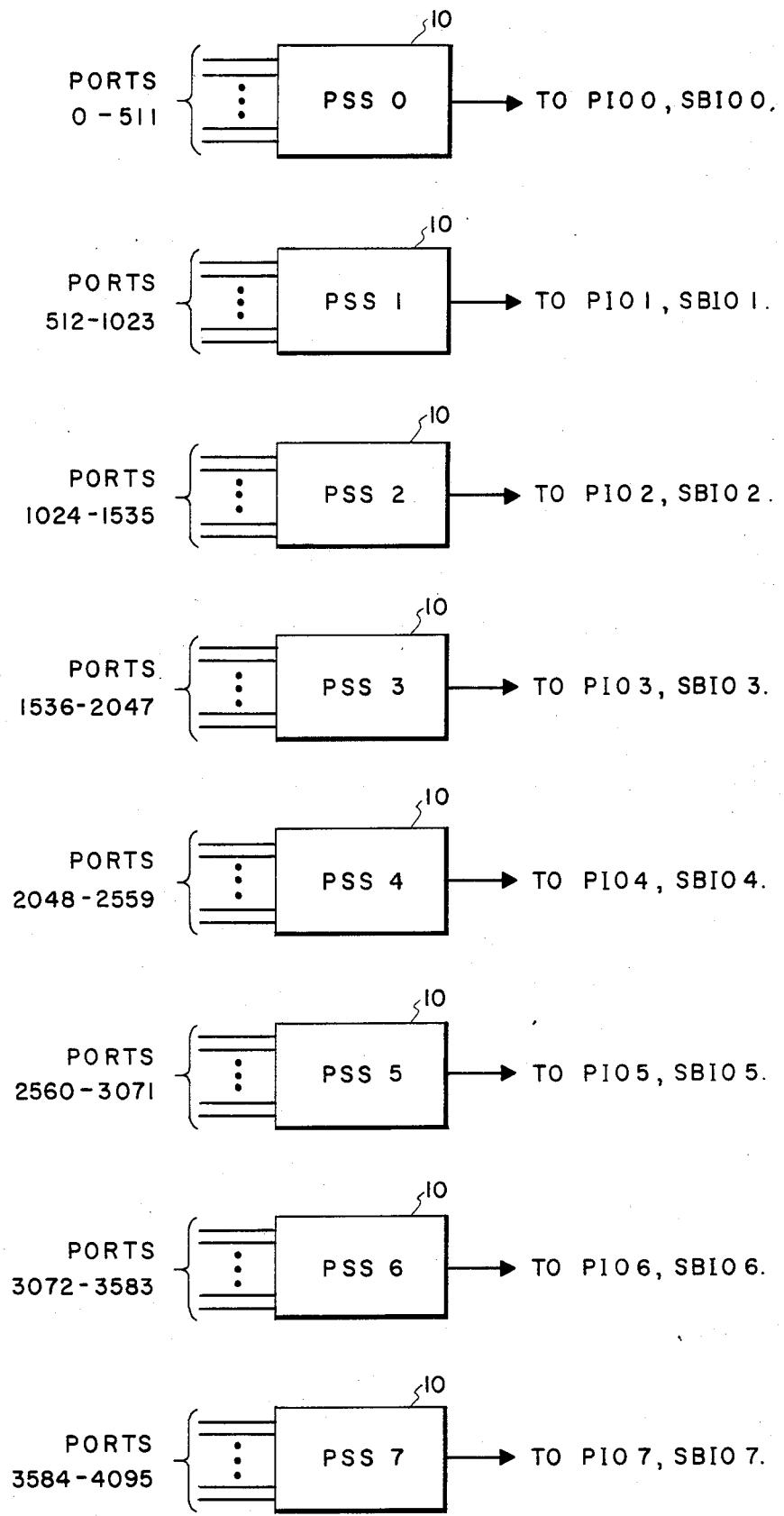
FIG. 3 shows a block diagram of a port subsystem.

Referring to FIG. 3, there is shown a block diagram of the port subsystem. The port subsystem of the preferred embodiment comprises port subsystem ∅ through port subsystem 7 (PSS∅-PSS7). Each port subsystem 10 has associated therewith 512 ports, PSS∅ having ports ∅ through 511, ... and PSS7 having ports 3584 through 4095. Each port subsystem 10 interfaces with a corresponding primary switch I/O, PIO, and a corresponding standby switch, I/O SBIO. Thus, PSS∅ interfaces with PIO∅ and SBIO∅, PSS1 interfaces with PIO1 and SBIO1, ..., and PSS7 interfaces with PIO7 and SBIO7.

Figure 4:
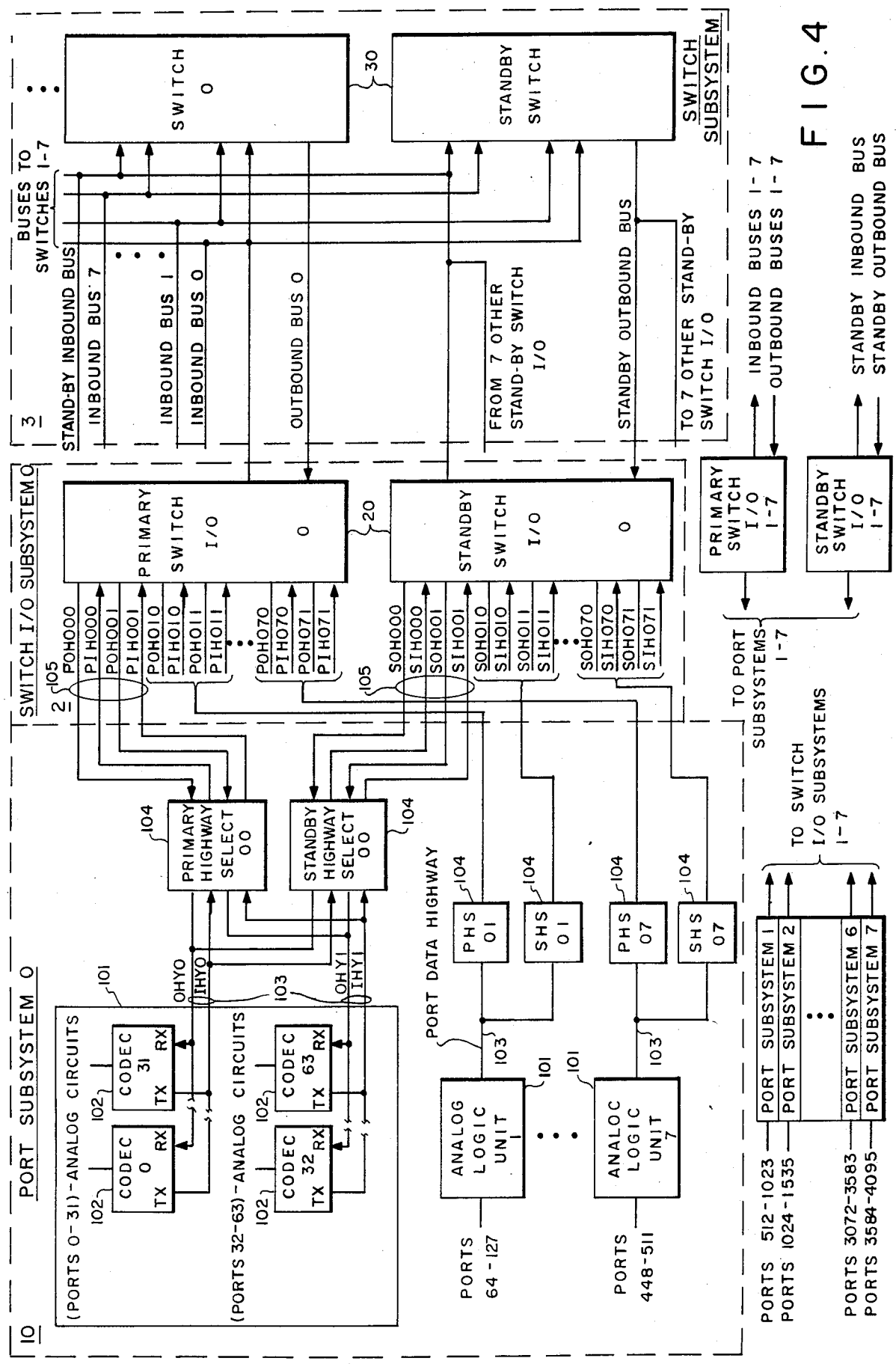
FIG. 4 shows a functional block diagram of the preferred embodiment of the port subsystem utilized in the digital switch system of FIG. 1.

Referring to FIG. 4 there is shown a functional block diagram of a port subsystem. Port subsystem ∅ 10 interfaces with switch I/O subsystem ∅ 2', which comprises primary switch I/O ∅ and standby switch I/O ∅. Port subsystem 0 includes eight analog logic units 101 which are each capable of supporting 64 ports. Ports ∅-31 each accept an analog signal via an analog circuit (not shown) which is coupled to a corresponding CODEC 102. The input (TX) and the output (RX) of the 32 CODECS 102 for ports ∅-31 are coupled to form an input highway ∅, IHY∅, and output highway ∅, OHY∅, respectively. Likewise CODECS 102 are provided for ports 32 through 63, the output of the second grouping of CODECS forming input highway 1, IHY1, and output highway 1, OHY1. IHY∅, IHY1, OHY∅, and OHY1 form port data highway 103 which is coupled to a primary highway select (PHS) 104 and a standby highway select (SHS) 104. Analog logic unit 101 which includes ports ∅-63 is designated as analog logic unit 0, analog logic unit 101 which includes port 64-127 is designated as analog logic unit 1, ... and analog logic unit 101 which includes ports 448-511 is designated as analog logic unit 7. Each analog logic unit 101 has associated therewith a corresponding PHS 104 and SHS 104, which is designated as PHSXY and SHSXY, where X is the port subsystem number and Y is the analog logic unit number. (Likewise, port subsystem 1 10 has eight analog logic units 101, 0-7, corresponding to ports 512-575, 576-639, ... and 960-1023, with an associated PHS 10-PHS 17, and SHS 10-SHS 17, respectively.) The analog circuitry (not shown) of analog logic unit 101 can include circuitry for handling voice signals associated with telephone communications which is well known by those skilled in the art will not be discussed further. The CODECS 102 of the preferred embodiment utilizes a Motorola MCXXXX.

Primary switch I/O ∅ and standby switch I/O∅ interface with port subsystem ∅. PI/O ∅ interfaces with PHS∅-PHS7, and SBIO ∅ interfaces with SHS ∅ and SHS 7, via I/O data highway 21, more specifically denoted here as switch data highway 105. The interface of PI/O ∅ includes POH 000, PIH 000, POH 001, PIH 001, ... and PIH 071. (The switch data highway 105 is designated PIH, POH, SIH and SOH XYZ, where P is the primary switch I/O and S is the standby switch I/O, IH or OH is the input highway or output highway, X designates the port subsystem number, Y indicates the analog logic unit number within the port subsystem, and Z designates the 0 or 1 port data highway number 103.) The SBIO interface includes the corresponding lines from the eight SHS 104.

Referring to FIG. 5, the switch I/O 20 will now be discussed. As mentioned above the SWIO 20 translates serial data from the port subsystem 10 into an eight bit parallel format and transmits the parallel data to the associated switch 30 via the inbound bus. The SWIO 20 also receives data from the switch 30 via the outbound bus and reformats the parallel data to a serial data format for transmission to its corresponding port subsystem 10. As discussed above, in conjunction with FIG. 4, the SWIO 20 of the preferred embodiment has 16 input lines coupled from its corresponding port subsystem 10, the input lines being designated IH00 through IH71. Each input line is coupled to a respective eight bit serial-parallel register 201-216, the eight bit parallel data being transferred to a corresponding eight bit register 221-236. Each eight-bit register 221-236 is sequentially strobed by a corresponding strobe signal $\overline{ST0}$-$\overline{ST15}$ such that each eight-bit register 221-236 is strobed once during a sub-frame. The data from each eight bit register 221-236 is thereby coupled in turn to a holding register 237 which outputs the data onto the inbound bus. (Note: j is the SWIO 20 number, thus for SWIO 0, j=0, etc.) The holding register 237 is enabled by an enable signal $\overline{IBE}$, which will be discussed further hereinunder.

Figure 6:
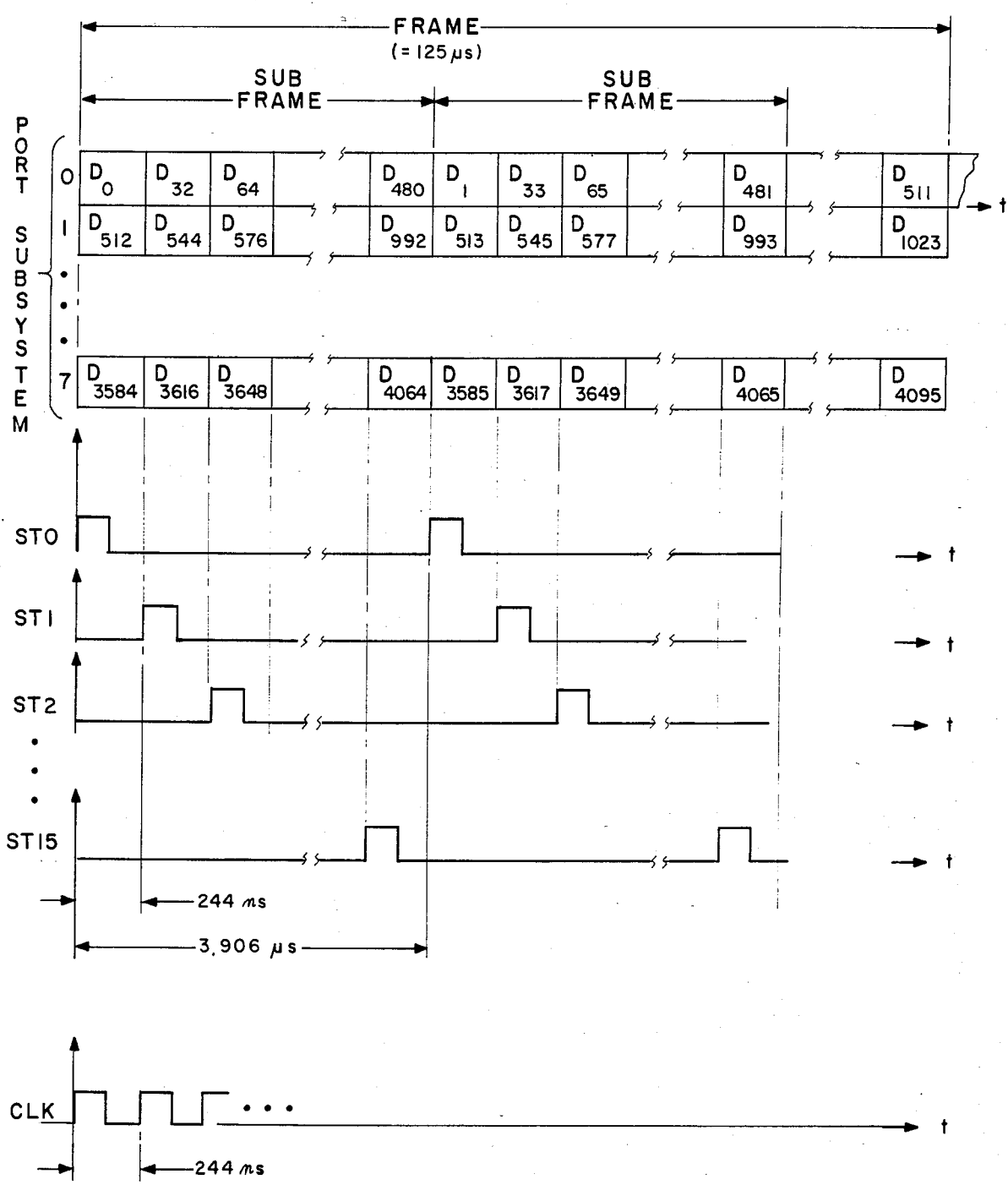
FIG. 6 shows a timing diagram of the data read from ports of the port subsystem and some timing signals.

The strobe signals $\overline{ST0}$-$\overline{ST15}$ are generated by a counter 217 and decoder circuit 218, 219. CLK4 of the preferred embodiment which drives counter 217 is a 4.096 MHZ is supplied from the timing generator 50. Referring to FIG. 6, there is shown the timing diagram of the strobe signals ST0-ST15. As mentioned above each eight bit register 221-236 is strobed once during a sub-frame, a sub-frame of the preferred embodiment being 3.906 microseconds, and the serial input bit rate from each of the 16 input lines is 2.048 MHZ. Thus, the first strobe ST$\emptyset$ reads the data from port $\emptyset$, the next strobe ST1 reads the data from port 32 which is from input line IH01, the next strobe ST2 reads the data from port 64 which is from input line IH10, . . . until the last strobe of the sub-frame ST15, which reads the data from input line IH71 which corresponds to the data from port 480. The next sub-frame reads the data from the next sequential port from each input line, thus the data being read is the data from port 1, then the data from port 33, then the data from port 65 . . . until the end of the sub-frame which reads the data from port 481. It can be seen then, that 32 sub-frames, which makes up one frame, is required to read the data from all 512 ports associated with a port subsystem. (The foregoing has been the data read from port subsystem 0. In parallel with the above read operation, port subsystem 1 through port subsystem 7 have each been reading the data from the respective ports in a like fashion.) The clock signal CLK (or CLK4) of the digital switch system 1 is shown.

Referring back to FIG. 5, the data from holding register 237 is also coupled to a loop register 238, which is enabled by a loop control signal (LC). In normal operation LC is such that the loop register 238 is disabled. However, in a verification mode the loop register 238 can be enabled such that the inbound data is looped back to the outbound bus without the data being transmitted to the corresponding switch 30.

Outbound bus data from the corresponding switch 30 is coupled via the outbound bus j to the corresponding SWIO 20 and coupled into a buffer 239. A plurality of latches and parallel to serial registers 240 is provided which performs the inverse operation of that discussed above. The serial data is then coupled to a plurality of drivers 220 for output on the respective output lines OH00 through OH71.

Figure 7:
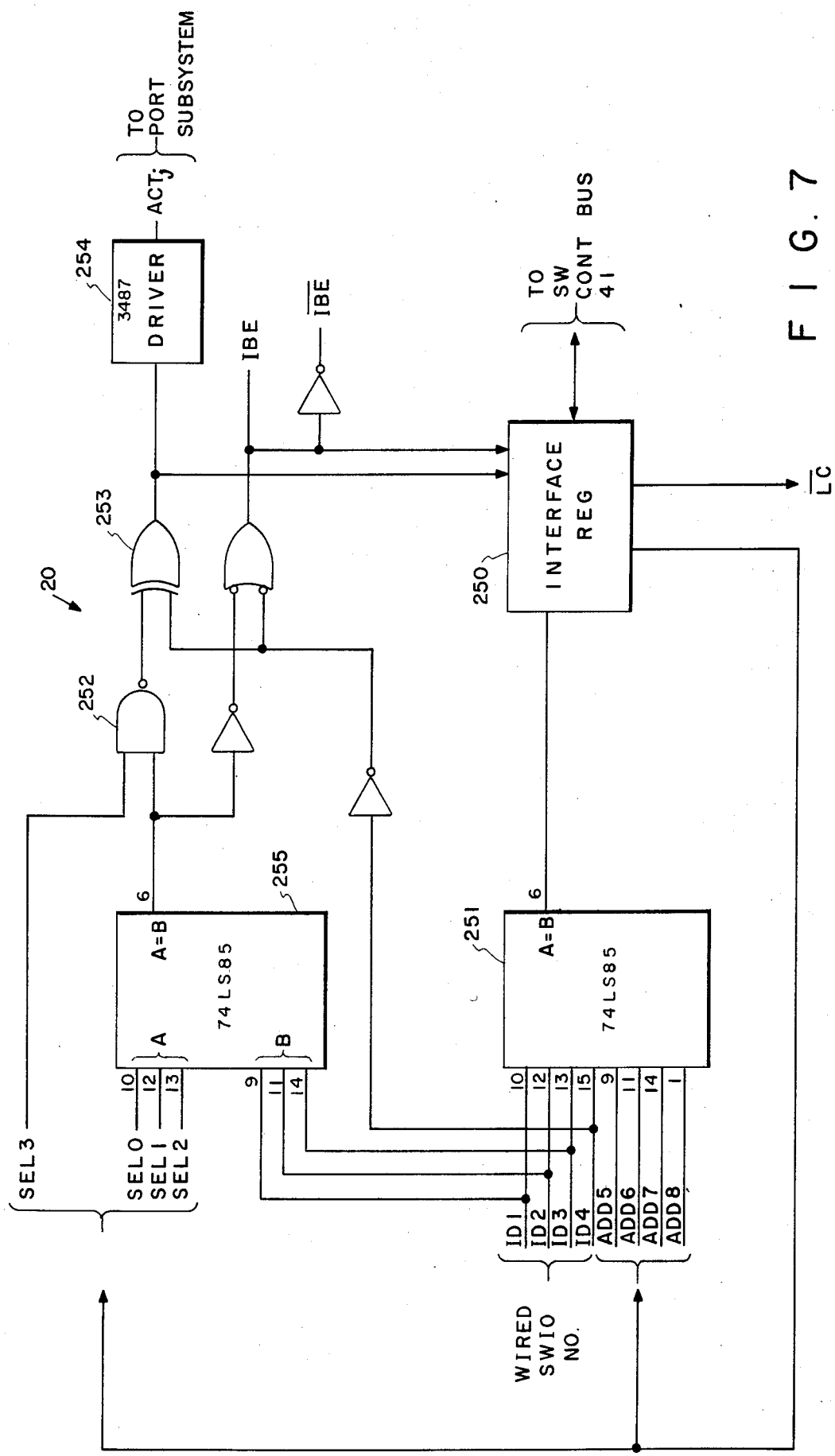
FIG. 7 shows a logic diagram of the control logic of the preferred embodiment of the switch I/O subsystem.

Referring to FIG. 7, the control logic of the SWIO 20 is shown. An interface register 250, which is coupled to the switch control bus 41, provides status information to the switch controller 40 and also provides a means for permitting the switch controller 40 to transmit status and command information to the SWIO 20. Each SWIO 20 can be accessed individually by the switch controller 40 via address line ADD5-ADD8 of the switch control bus 41. These address lines are coupled to the first set of inputs of a comparator 251. The second set of inputs of comparator 251 are coupled to signals ID1-ID4 which are hard wired signals for each SWIO 20. The ID1-ID4 signals for each SWIO are unique thereby providing a means for identifying PIO$\emptyset$-7 and SBIO $\emptyset$-7. When the first and second set of inputs to comparator 251 are equal, the interface register 251 is enabled thereby permitting the switch controller 40 access to the interface register 250.

In the preferred embodiment the SWIOs designated as standby SWIOs have ID4 set to a logic 0, and ID 1-3 indicate the number 0-7 corresponding to SWIO $\emptyset$-7. Likewise ID 4 is set to a logic 1 for all the SWIOs 20 designated as PIOs and ID 1-3 indicate the number $\emptyset$-7. Normally, all the standby logic of digital switching system 1 is inactive. In a standby configuration, the SBY SW 30 is substituted for a single primary switch SWj 30, the operation of SW30 to be discussed further hereinunder. Also, in a standby configuration, the SWIOj is substituted for the PIOj. The standby configuration is controlled from the switch controller 40 by four signal lines SEL0—SEL3 via the switch control bus 41. In a normal configuration, SEL3 is a logic 0. Hence, the first input to exclusive OR gate (X-OR) 253 is a logic 1. The second input to X-OR gate 253 will be a logic 0 for all the primary I/Os, since ID4 is a logic 1. Hence, the output of X-OR gate 253 is a logic 1 activating the driver network 54 and providing an active signal to its associated port subsystem via the ACTj signals. The ACT signal will be discussed further hereinunder. Since all the standby switch I/Os have ID4 equal to a logic 0, the second input to X-OR gate 253 is a logic 1, and since both inputs to X-OR gate 253 are logic ones, the output is a logic 0 thereby disabling the respective driver networks 254 for all the standby switch I/Os. The inbound bus enable signal (IBE and $\overline{IBE}$, which is coupled to holding register 237) is such that the holding register 237 for all the primary I/Os will be enabled.

When SEL3 is set to a logic 1 the standby configuration is designated. The SWIOj specified by the switch controller 40 via the SEL0-SEL2 signals, will result in a compare equal output from a comparator 255, that is, one primary and one standby switch I/O will have an output from the comparator 255. For the specified primary SWIO, the first input to X-OR gate 253 will be a logic 0 since both inputs to NAND gate 252 are a logic 1, and the second input to X-OR gate 253 remains at a logic 0, thereby resulting in a logic 0 output and removing the active signals to the primary highway select j of the corresponding port subsystem. Likewise, for the specified standby SWIO, the first input to X-OR gate 253 will be a logic 0, and the second input to X-OR gate 253 remain at a logic 1. In this case, the X-OR gate 253 is enabled thereby providing the enable signal to its driver 254 providing the active signals to the standby highway select logic of the specified port subsystem.

The active signal and the inbound bus enable signal are coupled to the interface register 250 for providing status information to switch controller 40. The switch controller can command the loop-around capability by providing the loop control signal (LC) to the interface register 250 which is coupled to the loop register 238.

Figure 8A:
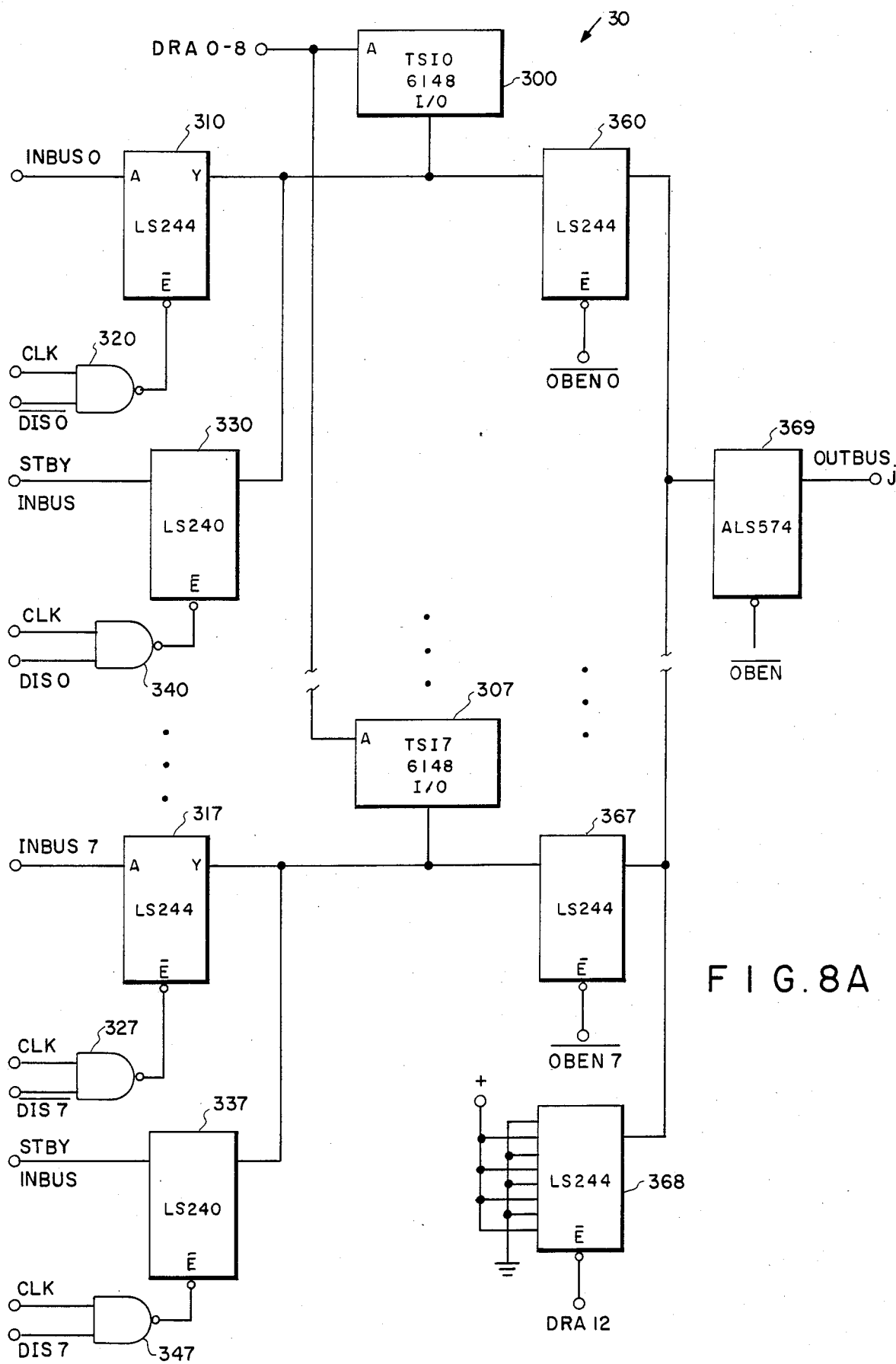
FIGS. 8A–8C, shows a logic diagram of the preferred embodiment of the switch subsystem.

Referring to FIG. 8A, there is shown a partial logic diagram of the switch 30. Each switch 30, SW$\emptyset$-SW7 and SWSBY, includes eight data RAMS (TSI$\emptyset$-TSI7) 300-307, wherein each data RAM of the preferred embodiment is a 6148 IC, 512×8 RAM. The data to be inputted to each data RAM 300–307 is coupled from the corresponding INBOUND bus (INBUS), i.e., TSI∅ 300 is operatively coupled to INBUS ∅, TSI1 301 is operatively coupled to INBUS 1, ... and TSI7 307 is operatively coupled to INBUS 7. The data from each INBUS line is coupled through a corresponding buffer 310–317 which is enabled via an associated enable signal $\overline{DIS\emptyset-DIS7}$ signal, coupled through NAND gate 320–327, respectively. In addition, each data RAM is operatively coupled to the standby bus (STBY INBUS) through a second buffer 330–337 which is enabled by an associated DIS∅–DIS7 signal coupled through NAND gate 340–347. In a normal configuration, enable signals $\overline{DIS0}$ through $\overline{DIS7}$ are at a logic one which operates to operatively connect each TSI 300–307 to its corresponding INBUS. Conversely, DIS0 through DIS7 are at a logic zero disabling each second buffer 330–337, thereby decoupling the STBY INBUS from any of the data RAMS 300–307.

Figure 8B:
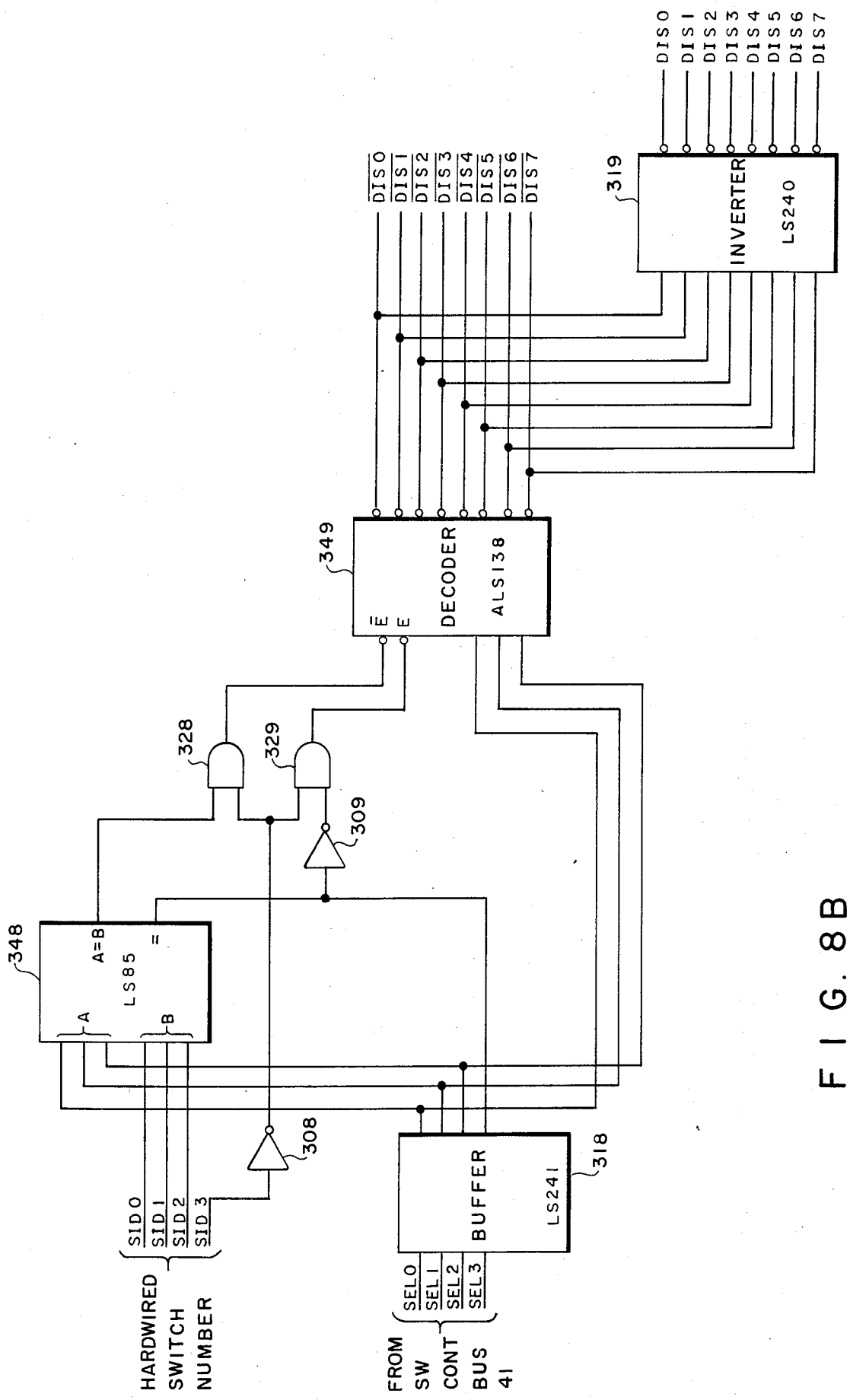

Referring to FIG. 8B, there is shown control logic of each switch 30 for controlling the configuration of the switch 30 in response to the control signals SEL0-SEL3. Each switch 30 interfaces with the switch control bus (SW CONT BUS) 41 for receiving the SEL0–SEL3 signals through a buffer 318. In a normal configuration, SEL3 is a logic 0, which disables comparator 348 and decoder 349 for each primary switch S∅-S7, resulting in the DIS∅-DIS7 signals output from an inverter 319 to be in a logic 0 state and the $\overline{DIS\emptyset-DIS7}$ signals output from decoder 349 to be in a logic one state, thereby coupling each TSI ∅-7 300–307 to its respective INBUS for each primry swtich, SW∅ through SW7. Each switch is identified by an ID number which is hardwired for each switch 30, the switch number being contained in a signal SID∅–SID3 of each switch. SID∅–SID2 identify primary switch 0-7 where SID3 is a logic 0. The standby switch has SID3 equal to a logic 1. Therefore, for the standby switch 30, since the output of inverter 308 is a logic 0, the output of AND gate 328 is a logic 0 and the output of AND gate 329 is a logic 0, enabling decoder 349 which results in the DISx (where x can be from 0-7 as determined by SEL∅-2) being at a logic 0 which decouples the standby switch from the primary inbound buses 0-7.

When SEL3 equals a logic 1, the standby mode (or configuration) is selected. When SEL3 equals a logic 1, the output of inverter 309 is a logic 0 resulting in a logic 0 output from AND gate 329. Assuming for purposes of example and in no way intended to limit the present invention, that the SEL∅-2 signals correspond to a value of 7, the output of comparator 348 will be a logic 0 for all the comparators of switches 0-6, enabling decoder 349. Hence, the output of decoder 349 for switches 0-6 will result in $\overline{DIS7}$ being at a logic 0 and $\overline{DIS\emptyset-6}$ will be at a logic 1. Thus switches 0-6 will have TSI∅–TSI6 300–306 coupled to the respective inbuses 0-6. Since $\overline{DIS7}$ is at a logic 0, and DIS7 is at a logic 1, buffer 317 for each switch ∅-6 will be disabled and second buffer 337 for each switch ∅-6 will be enabled resulting in SW∅-6 being coupled to the standby bus and decoupled from inbus 7. In this example, the output of comparator 348 for switch 7 will be at a logic 1, and a logic 1 output from AND gate 328, thereby disabling decoder 349. With decoder 349 disabled, the outputs $\overline{DIS\emptyset-DIS7}$ are at a logic one.

The output of comparator 348 for the standby switch is a logic 0, thereby enabling its decoder 349, resulting in $\overline{DIS\emptyset-DIS6}$ being at a logic 1 and $\overline{DIS7}$ being at a logic 0. Thus, the standby switch is effectively coupled to INBUS 0 through INBUS 6 and STBY INBUS. Hence, it can be seen that this example, the standby bus and the standby switch have been substituted for inbus 7 and switch 7 respectively. In a like fashion, the standby bus and the standby switch can be made to substitute for any one of the inbuses and corresponding primary switches as commanded by the select signals SEL0–SEL3.

Figure 8C:
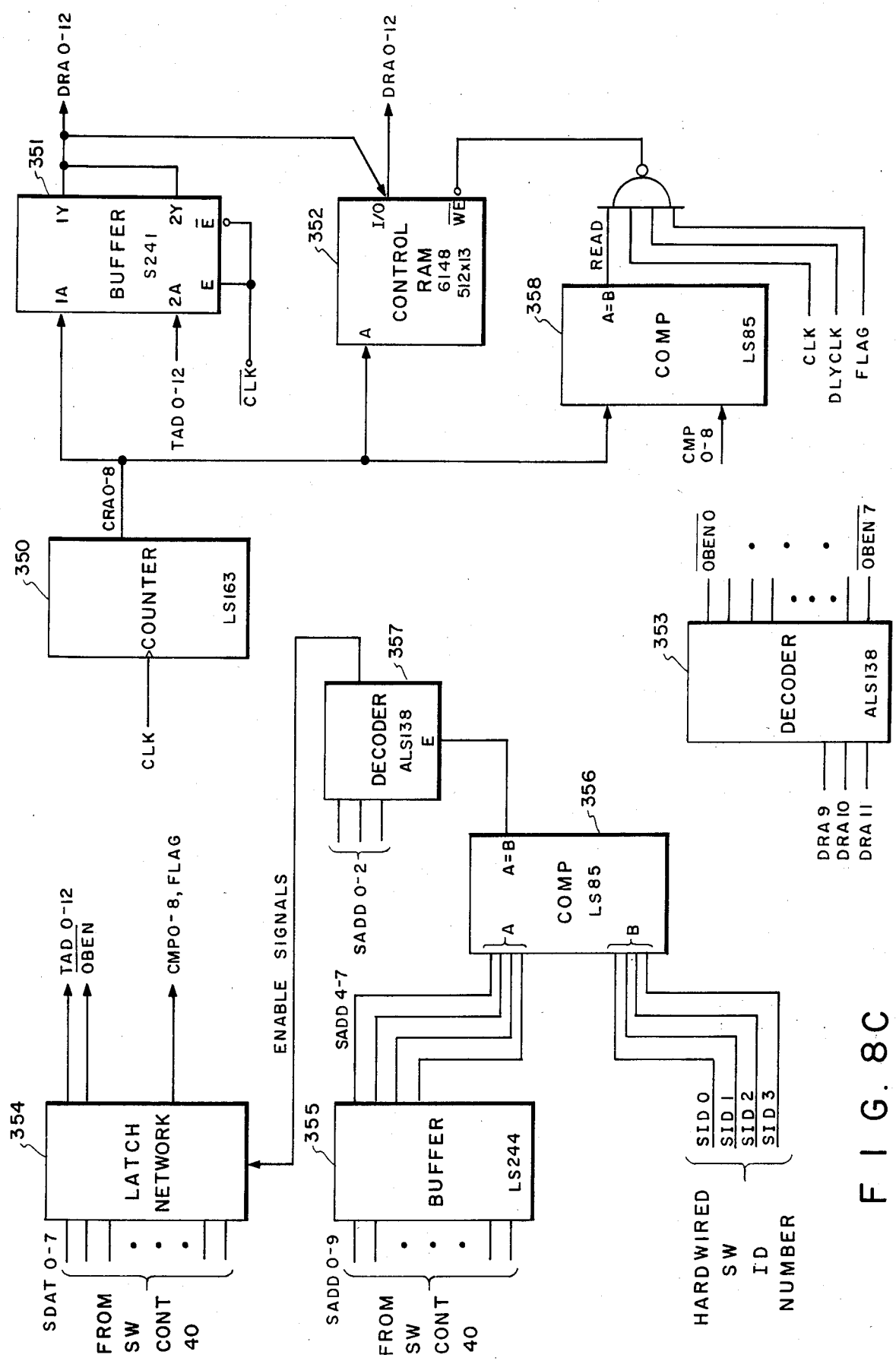

As discussed above, each switch 30 has an interface to the eight primary inbound buses and has one outbound bus. Each switch 30 contains eight TSIs (time slot interchanges) 300–307, each TSI of the preferred embodiment of the present invention being an 8×512 bit RAM, allowing each switch 30 to accept data from any of the 4,096 ports. Referring to FIG. 8C, the read/write control logic of the TSIs is shown. Inbound data is received from the switch I/O subsystem 2 in parallel format. Each inbound bus contains data in 512 time slots as discussed above in conjunction with FIG. 6, each time slot containing eight bits of parallel data from a port. The data in each time slot is written into the respective TSI during the positive half of the CLK signal of each time slot. The TSI write address, which is the same for all eight TSIs 300–307, is determined by a synchronous counter 350 which generates the DRA 0-8 address signals and is coupled to the address terminal of each TSI 0-7 300–307 via a buffer 351, the buffer 351 being enabled by the clock signal CLK during the positive half of CLK. Also, during the positive half of CLK, when FLAG is set by switch controller 40 and when CRA∅-8 is equal to CMP∅-8, control data is written into a control RAM 352 in the address specified by the address signal CRA∅-8 from synchronous counter 350. The control RAM 352 of the preferred embodiment is a 13×512 state RAM. The control data stored in the control RAM 352 contains the TSI data RAM read address (DRA 0-8), the outbound data bus (DRA 9-11), and a connect bit for the quiet termination buffer (DRA 12). During the second half (or low portion) of the CLK signal, the control RAM 352 is read. The data read from the control RAM 352 contains data to select one of the 512 location of each data RAM 300-307 via the address line (DRA 0-8) and also includes the 3 bits DRA 9-11 for selecting one of the eight data RAMS 300-307 to be enabled onto the outbound bus associated with the switch 30. The output of decoder 353 generates enable signals $\overline{OBEN}$ ∅-7 for enabling one of the output latches 36∅-367 shown in FIG. 8A. The DRA 12 bit is also output from the control RAM which enables latch 368 for providing a fixed output (i.e., quiet termination) for disconnected ports on the outbound bus in order to properly interface with a CODEC. Enable signal OBEN enables the outbound bus latch 369 and is provided as a control input signal from switch controller 40. Each switch receives control information (SDAT 0-7 and SADD 0-9) from switch controller 40. A latch network 354 is provided for receiving control information from switch controller 40, including information to be stored in the control RAM (TAD ∅-12) the output enable signal OBEN, the time slot of the data to be outputted (CMP ∅-8), and a read/write flag (FLAG) indicating a read or write of the control RAM 352. A buffer 355 receives the SADD 0-9 data from the switch controller 40. SADD 4-7, which specifies the switch address, is coupled to a comparator 356 for comparing the specified switch number with the hard-wired switch ID number SID ∅-3. The output of comparator 356 is a logic 1 for the specified switch 30 which enables decoder 357 to decode the specific functions specified by control signals SADD 0-2. The output of decoder 357 is enable signals which are coupled to latch network 354 for receiving the control data from switch controller 40 in the respective latches.

Figure 9:
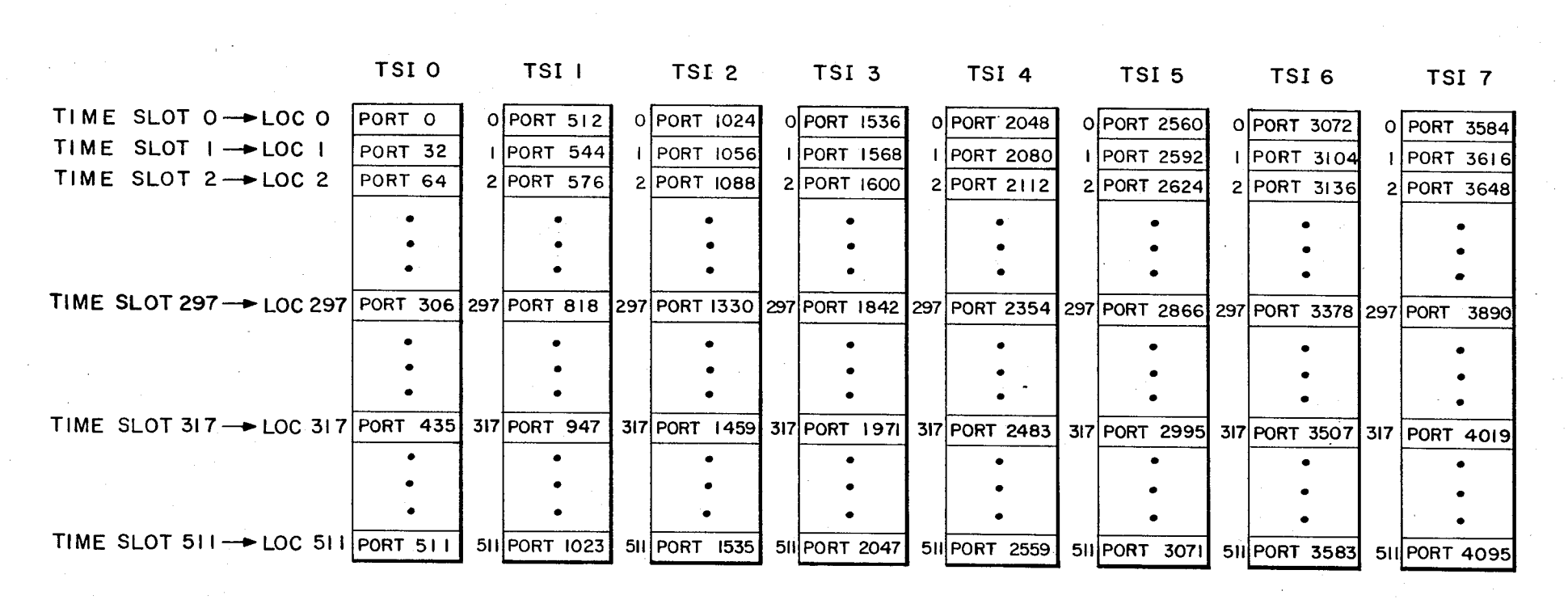

An example of establishing a link between two ports is given with the aid of FIG. 9. Assume for purposes of example that port 947 is to be linked with port 3378. The synchronous counter 350 of each switch counts from 0 to 511, the value of the synchronous counter 350 corresponding to a time slot, the time slots of each switch 30 being synchronized. As explained above in conjunction with the switch I/O 20/port subsystem 10 interface, at time slot 317 the data from port 435 will be written into location 317 to TSI∅300, the data from port 947 will be written in location 317, or TSI1 301, . . . and the data from port 4019 will be written into location 317 of TS17 for each switch 30. The loading of the data into the respective TSIs occurs during the first half (or positive half) of the CLK signal as described above. The contents will be the same for all eight TSIs for all eight switches 30. During the second half of the CLK signal, for switch 6 only, and at a time slot of 297, a data RAM address (DRA ∅-8) of 317 is inputted to the control RAM 352 along with the output bus enable signals for enabling TSI1 (i.e. OBEN1). Thus, on the next cycle during time slot 297, the control RAM data in location 297 will be read out for switch 6 and point to location 317. Location 317 will be read for all eight TSIs of switch 6, however only the TSI1 output will be enabled onto outbus 6. This data is the data inputted from port 947 and is outputted onto OUTBUS 6 from switch 6, and occurs at time slot 297. This time slot for switch 6 corresponds to port 3378 which is the port desired to be linked with port 947. The writing of the control RAM 352 and the data written into the control RAM 352 is controlled by the switch controller 40 via the switch control bus 41. In a similar fashion, the link between any two ports is made. As described above, once the SBY switch 30 is substituted for a primary switch, the operation of the SBY switch operates as though it were a primary switch as described above, the above example can also be applied to the standby switch.

Referring to FIG. 10 there is shown a block diagram of the highway select unit 104 of the port subsystem 10. The input serial data received via the port data highway 103, IHY∅ and IHY1, is transmitted to the switch data highway 104, IHXY∅ and IHXY1, through a first multiplexer MUX 401 and a second MUX 402, respectively. Outbound serial data (OHXY∅, OHXY1) received from the corresponding switch I/O 20 is coupled to the port subsystem 10 via port data highway 103 (OHY∅, OHY1) through a buffer 403. Control and status registers 404 are provided by the highway select unit 104 for interfacing with the port controller 60 via the port control bus 61 to receive control and status information. Loop units 405, 406, controlled from information contained in the control and status registers 404, are provided for looping data on the inbound switch data highway 105 to the associated outbound switch data highway (i.e., IHXY∅ is looped to OHXY∅, or IHXY1 is looped to OHXY1). The ACT signal described above in conjunction with FIG. 7, is received from the corresponding switch I/O 20 and enables the buffer 403 for the active highway select unit 104. A timing generator 407 generates the timing signals from the input CLK signal. The timing signals provide the time slot assignment for the ports of the port subsystem 10, the timing signals being transmitted to the corresponding port subsystem 10 via buffer 403.

A connect verification logic unit 408 is provided for verifying test data through the digital switch system 1. The connect verification logic unit 408 interfaces with the control and status registers 404 for receiving and reporting control and status information from the port controller 60. Various modes are provided by the connect verification logic unit 408 for verifying the data paths of the digital switch system 1. At a predetermined time slot a fixed test data block can be inserted into the serial data of the port data highway via MUX 401, 402 controlled by the connect verification logic unit 408. The connect verification logic unit 408 thus provides a control for looping the inbound data to the outbound data terminal on the highway select unit 104 for verifying the test data block thereby being able to verify the portion of the data path included in the loop and aiding in isolating a faulted area.

Figure 11A:
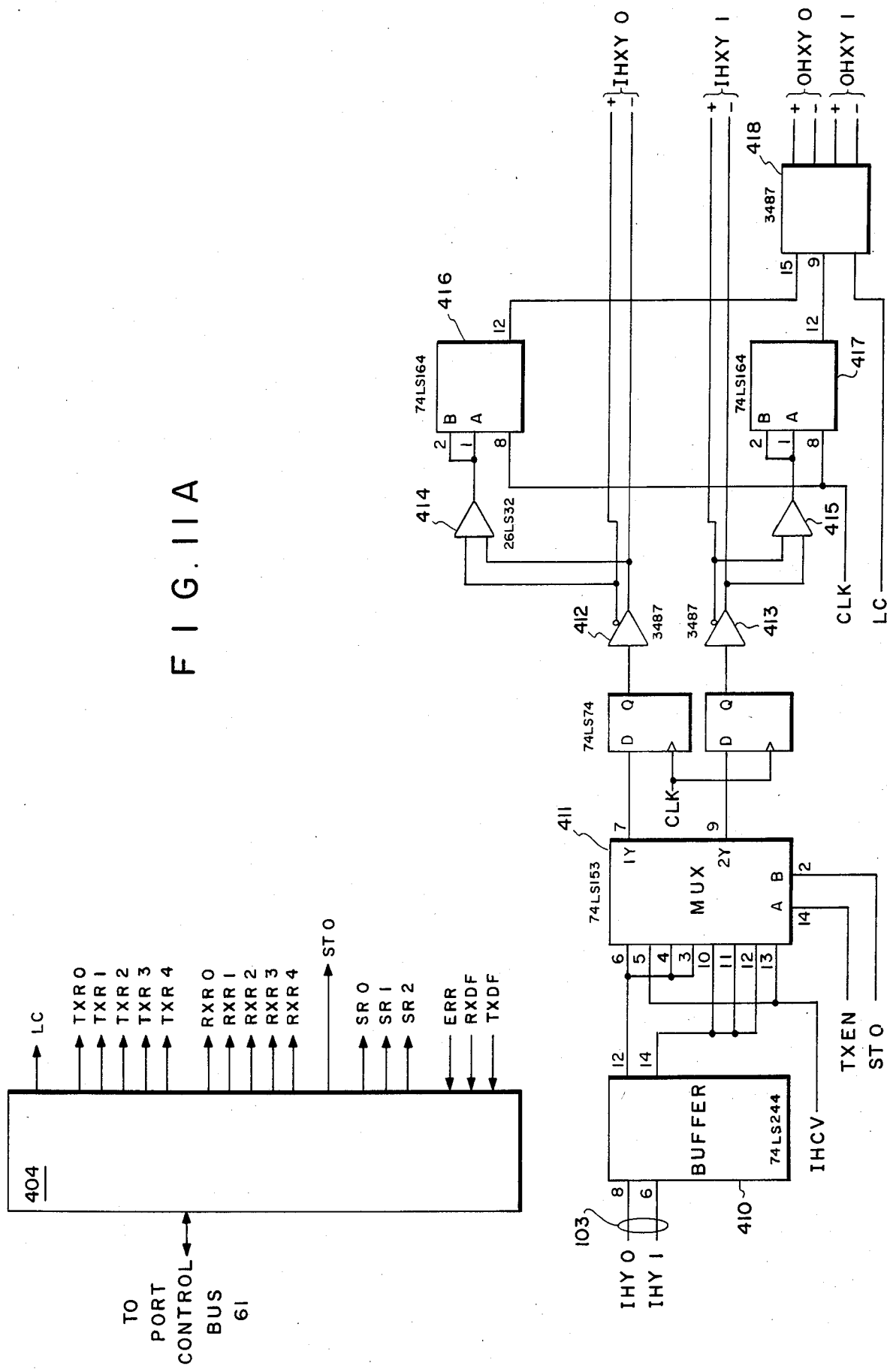
FIGS. 11A–11C, shows a logic diagram of the preferred embodiment of the present invention of the highway select unit.
Figure 11B:
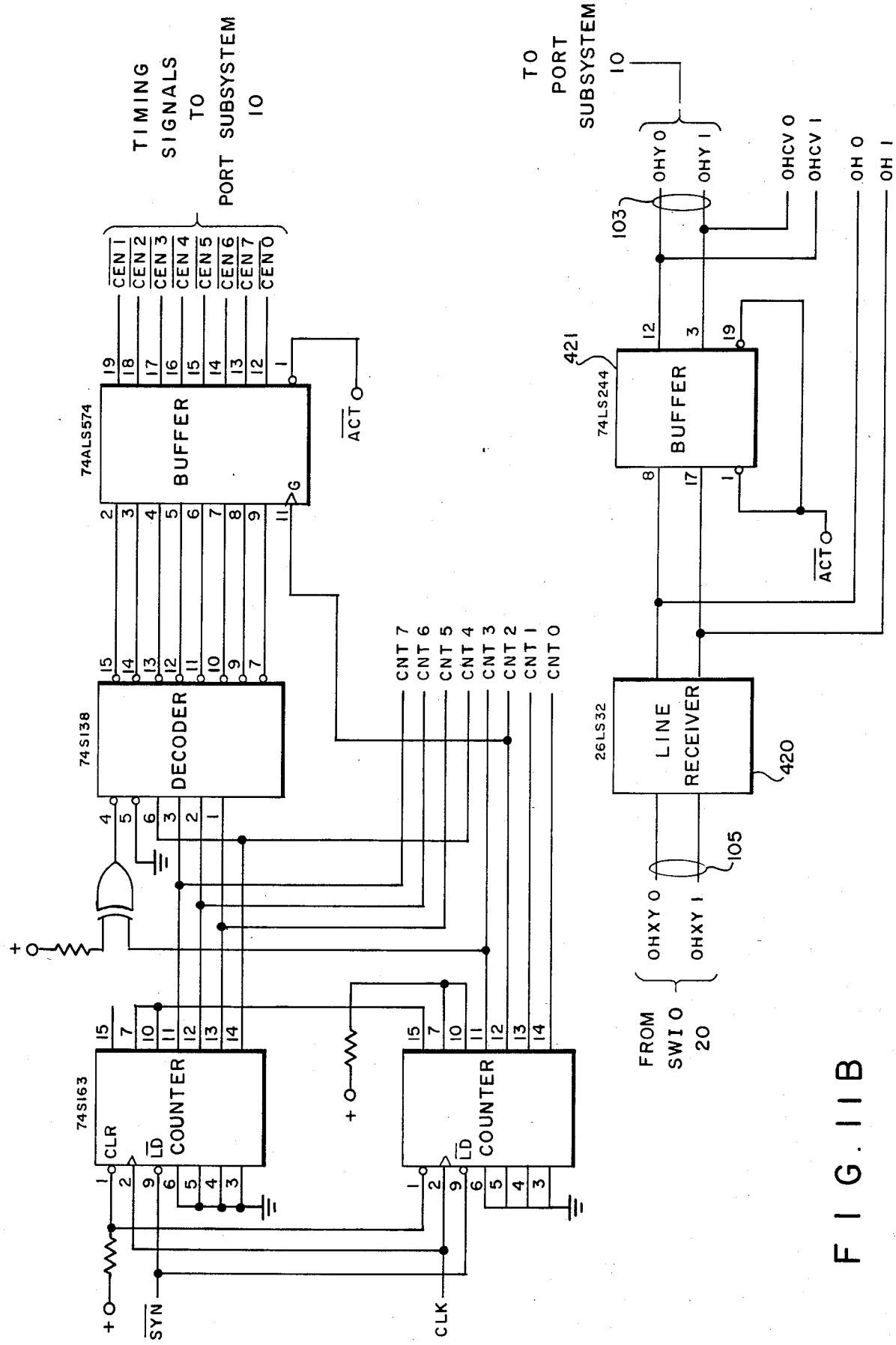
Figure 11C:
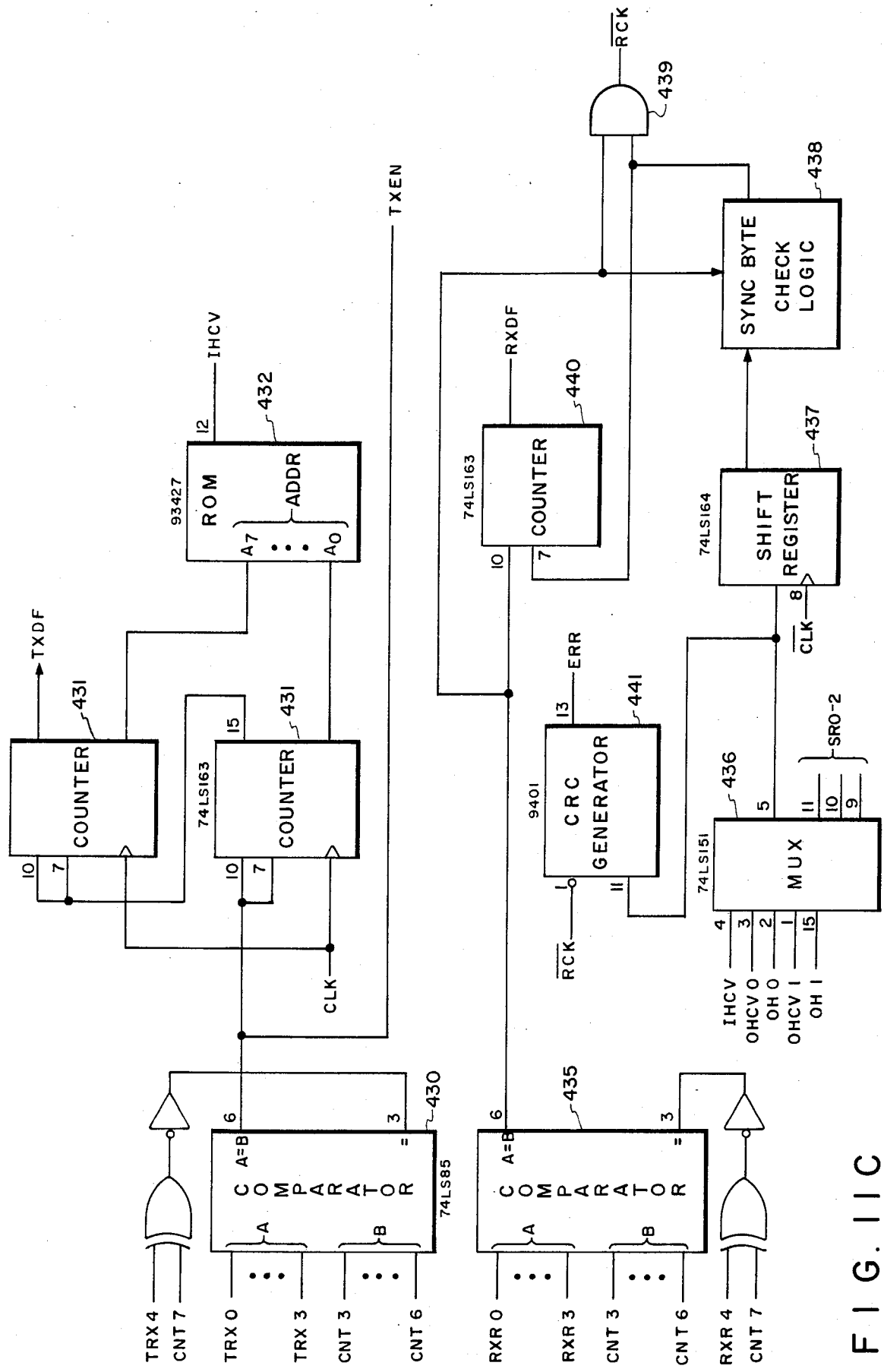

Referring to FIG. 11, which is comprised of FIGS. 11A–11C, a connect verify logic unit 408 will be described in detail. Referring to FIG. 11A, status and control register 404 is coupled to port control bus 61 for receiving and transmitting status and command information from and to the port controller 60. Command information received from the port controller includes the loop control, LC, which causes the inbound data received from inbound port data highway IHY∅, IHY1 to be looped to the switch data highway 105 OHXY∅, OHXY1, through the loop units 405, 406. Transmission time slot address TXR∅-TXR4 is received from the port controller 60 which indicates the time slot in which the verification logic unit 408 is to insert the test block data. The received time slot address RXR∅-RXR4 is received from the port controller to indicate the time slot in which the test data block is to be received. ERR is an error signal which indicates an error has been detected by the connect verification logic unit 408. RXDR is a signal to the port controller 60 which indicates that the test data block has been received. ST∅ is a control signal which selects the inbound data highway to be selected as the transmission path. SR∅-2 indicates the loop to be selected and TXDF is an indication to the port controller 60 that the test data block has been transmitted.

Still referring to FIG. 11A, there is shown the logic for looping the serial data from the inbound port data highway 103 onto the unbound switch data highway 105. The inbound port data highway, IHY∅, IHY1 103 is input to a buffer 410. The output of the buffer 410 is directed into a dual MUX 411. In addition, the test data block (IHCV) is also inputted to the dual MUX 411. The output of the dual MUX 411 is either the inputted serial data received from the input port data highway 103 or the test data pattern, IHCV, as a function of the select signals TXEN and ST∅. Dual MUX 411 provides the capability for inserting the test data block into the serial data stream received from the input port data highway 103, when TXEN is a logic 1 the time slot for the insertion of the test data has occurred. (The TXEN signal generation will be described in further detail hereinunder.) When ST∅ is a logic ∅ the test data pattern IHCV will be inserted in IHY∅, and when ST∅ is a logic 1 the test pattern IHCV will be inserted in IHY1. If TXEN equals a logic ∅ the test data block is not inserted into either of the serial input port data highway data stream. The outputs of dual MUX 411 are operatively coupled d to a line driver 412, 413, the output of line drivers 412, 413 being directed to the inbound switch data highways 104, IHXY∅ and IHXY1. (Note that the data highways are implemented with differential transmission lines and the drivers and receivers comply in the preferred embodiment with the EIA-RS-422 standard.) The output of line drivers 412, 413 are each coupled to a line receiver 415, 415 and the line drivers 412, 413 coupled to a respective register 416, 417. The output of registers 416, 417 are coupled to line drivers 418, the output of line drivers 418 being coupled to the outbound switch data highway 105, OHXY∅ and OHXY1. Line drivers 418 are enabled by the LC (loop control) signal which allows the data stream on the inbound port data highway 103 to be coupled onto the outbound switch data highway 105 providing a first loop of data path verification. The outbound highway drivers at the switch I/O are disabled. Data appearing on the inbound port data highway 103 is transmitted to the respective inbound switch data highway 105 by both the primary and standby highway select units 104 independent of the condition of the ACT signal. Selection of which data is to be used to make switch connection is made at the switch subsystem 30 level as described above.

Referring to FIG. 11B, the logic for generating the timing signals to the port subsystem is shown. The timing signals $\overline{CEN\emptyset}$-$\overline{CEN7}$ provide a time slot assignment for the ports associated with the port subsystem 10. In addition, timing generator 407 generates the count signals CNT∅-CNT7 utilized by the highway select unit 104 for determining the time slot in which the test data block is to be inserted or received.

Still referring to FIG. 11B, the logic for transferring the outbound switch data highway data is shown. Outbound switch data highway 105, OHXY∅ and OHXY1, is inputted from SWIO 20 into line receiver 420. The output of line receiver 420 is directed to a buffer 421 which is coupled to the outbound port data highway 103, OHY∅ and OHY1, respectively, which is in turn coupled to port subsystem 10. Buffer 421 is enabled by an active signal, ACT, which has been described above in conjunction with FIG. 7. The outputs of line receiver 420 OH∅ and OH1, and the outputs of buffer 421 OHCV∅ and OHCV1, are coupled to a MUX 346, thereby providing two additional loops of data verification paths, which will be described in conjunction with FIG. 11C.

Referring to FIG. 11C, the logic for inserting and receiving the test data block is shown. The trasmit time slot address TRX∅-TRX4 is compared in comparator 430 with the count signals CNT3-CNT7. When the specified time slot occurs an output from comparator 430 generates a count in counter 431. The output of counter 431 addresses a location in a ROM 432 which causes the first data word of the test data block to be fetched and outputted from the ROM, the output denoted here as IHCV. Since the data is serial, the counter 431 is incremented eight times during a selected time slot for each successive frame causing the next word from the ROM to be read and inserted into the input data stream as discussed above. The test data block consists of two synchronization bytes, 8 bytes of data, and a 2 byte CRC-16 check word as shown in Table 1.

TABLE 1

|  | E9 (hex) |
|---|---|
| Synchronization Bytes | 68 |
| Data Bytes | FF |
|  | ∅∅ |
|  | F∅ |
|  | ∅F |
|  | CC |
|  | 33 |
|  | AA |
|  | 55 |
| CRC-16 | XX |
|  | XX |

The output of comparator 530 is also denoted as TXEN. The TXEN signal indicates when the selected time slot occurs for transmitting the test data block into the input data stream as discussed above in conjunction with the operation of dual MUX 411. When the transmission of the test data block is completed, the counter 431 transmits the TXDF signal to the port controller 60 via port control bus 61 indicating that the transmission of the test data block is done. The port controller 60 specifies the receive time slot RXR∅-RXR4 to the receiving highway select with 104 which compares with count signals CNT3-CNT7 in comparator 435 with the receive time slot signals. The outbound data received by the highway select unit 104 and the test data pattern IHCV is coupled to a MUX 436, the specific loop in the data transmission path being selected by select signals SR0-2. The output data of MUX 436 is coupled to a shift register 437. The output of the shift register 437 is coupled to sync byte check logic 438 which checks the first two synchronization bytes of the test data block. When the first two synchronization bytes have been received and verified an enable signal is output from the sync byte check logic 438 to AND gate 439 and to counter 440 for enabling counter 440. After the first two synchronization sync bytes have been verified the output data from MUX 436 is coupled to a CRC generator 441 which is enabled during the specified time slot by the output of AND gate 439, the enabling signal being denoted as RCK. RCK is a gated clock applied to the clock input of the CRC generator 441. Counter 440 increments once on each successive frame until a count of 10 has been reached. When a count of 10 has been reached, counter 440 outputs the RXDF signal, which is the receive done indication, and is transmitted to the port controller 60 for indicating all the input data has been received. If no error signal is outputted from the CRT generator 441 then the specific data loop which has been selected has been verified as operating properly.

Operationally, the following sequence is executed to verify the digital switch path between two ports, Port A (the inbound port in this example) and Port B (the outbound port in this example). The port controller 60 initializes the connect verification logic of the highway select unit 104 to receive data in a specified time slot on the outbound data highway associated with Port B. The port controller 60 also initializes the connect verification logic of the highway select unit 104 to transmit the test data block in a preselected time slot on the inbound data highway associated with Port A. The verification logic of the highway select unit 104 associated with Port A sequentially multiplexes the test data block onto the inbound data highway one byte per frame in the time slot associated with Port A. When the test data block has been transmitted, the transmit done indication, TXDF, is transmitted to the port controller 60. The verification logic of the highway select unit 104 associated with Port B receives each byte of data which arrives in the outbound time slot associated with Port B. After the two sync bytes have been detected, the remainder of the data received in the preselected time slot is gated into the CRC generator 441. When the entire test data block has been received the received complete indication, RXDF, is transmitted to the port controller 60. When the indication is received by the port controller 60 that the test data block has been received, the port controller 60 examines the status bit ERR to determine if an error has been detected by the CRC generator 441.

Even though a data path desired to be verified is busy, the standby highway select unit 104, standby SWIO 20 and STBYSW 30 can be substituted for the primary subsystems associated with the port by operation of the digital switch system 1 as described above. The data path can then be verified as discussed above, thereby achieving the on-line feature of data path verification.

The drawings of the present invention indicate the integrated circuit chip number and the numbers around the periphery of the IC designate the pin number of the IC.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. In a digital transmission system having a plurality of input/output (I/O) means for receiving digital input data from a plurality of ports and transmitting digital output data to a plurality of ports, each I/O means having a predetermined number of ports associated therewith, each port of the digital transmission system having a unique identifier, wherein a first port of said digital transmission system communicates with a second port said digital transmission system via a data path through the digital transmission system, the first port being designated a transmitting port and the second port being designated a receiving port, the data path including a digital switching matrix and the I/O means associated with the transmitting port and the I/O means associated with the receiving port, each I/O means being operatively connected to said digital switching, matrix, each I/O means including apparatus for verifying the data path between the transmitting port and the receiving port, said apparatus comprising:
   (a) multiplexer means, having a first input terminal adapted to receive a data stream from the plurality of ports associated with the I/O means, and having a second input terminal adapted to receive a test data block, and further having an output terminal for outputting output data to said digital switching matrix, for selectively outputting said data stream and said test data block in a first predetermined time slot in response to a select control signal, said first predetermined time slot corresponding to the time slot associated with said transmitting port;
   (b) first comparator means for comparing a first input signal to a second input signal, and first input signal indicating a commanded transmit time slot and said second input signal indicating a time slot corresponding to the time slot of the data stream, the data from each port being allocated a predetermined time slot within the data stream, to output said select control signal when said first input signal is equal to said second input signal;
   (c) second comparator means for comparing a third input signal to said second input signal, said third input signal indicating a commanded receive time slot which corresponds to a time slot of the receiving port, to output an enable signal when said third input signal is equal to said second input signal; and
   (d) examining means having an enable terminal adapted to receive said enable signal, for extracting said test data block from said data stream to examine the test data block received by the I/O means associated with said receiving port in response to said enable signal thereby determining whether the test data block has been received error-free thereby verifying said data path.

2. An apparatus for verifying the data path between the transmitting port and the receiving port, according to claim 1 wherein said multiplexer means further comprises:
   (a) counter means for providing a count each time said first input signal equals said second input signal to generate an address signal, thereby fixing the size of said test data block to a predetermined size; and
   (b) memory means, having input terminals adapted to receive said address signals, and further having an output terminal adapted to transmit said test data block, said output terminal being operatively connected to the second input terminal of said multiplexer means, for storing preselected data which comprises said test data block.

3. An apparatus for verifying the data path between the transmitting port and the receiving port, according to claim 2 wherein said apparatus further comprises:
   looping means, operatively connected to the output terminal of said multiplexer means and further operatively connected to said examining means, for coupling said data stream directly into said examining means in response to a loop control signal, thereby modifying the data path by passing said digital switching matrix.

4. An apparatus for verifying the data path between the transmitting port and the receiving port, according to claim 3, wherein said examining means further comprises:
   receive counter means, operatively connected to said second comparator means, for providing a count each time said third input signals equals said second input signal to determine the end of the predetermined size of the test data block.

5. An apparatus for verifying the data path between the transmitting port and the receiving port, according to claim 4, wherein said examining means further comprises:
   (a) a sync byte check logic means, having an input terminal adapted to receive said data stream, for verifying sync data bytes which precede the test data block, thereby indicating that in subsequent frames, the test data block is to be included in the data stream, to generate a second enable signal when said sync data bytes have been verified, said second enable signal coupled to said receive counter means for enabling said receive counter means; and and-gate means for anding said second enable signal and said enable signal from said second comparator means to generate a third enable signal, said third enable signal forming the enable signal of said examining means.

6. In a digital transmission system having a plurality of input/output (I/O) means for receiving digital input data from a plurality of ports and transmitting digital output data to a plurality of ports, each I/O means having a predetermined number of ports associated therewith, each port of the digital transmission system having a unique identifier, wherein a first port of said digital transmission system communicates with a second port said digital transmission system via a data path through the digital transmission system, the first port being designated a transmitting port and the second port being designated a receiving port, the data path including a digital switching matrix and the I/O means associated with the transmitting port and the I/O means associated with the receiving port, each I/O means being operatively connected to said digital switching matrix, wherein the digital switching matrix includes a plurality of primary digital switch means and a standby digital switch means, each primary digital switch means being associated with a corresponding I/O means and said standby digital switch means capable of being switched from any one of said primary digital switch means in response to a switch control signal, each I/O means including apparatus for verifying the data path between the transmitting port and the receiving port, said apparatus comprising:

(a) multiplexer means, having a first input terminal adapted to receive a data stream from the plurality of ports associated with the I/O means, and having a second input terminal adapted to receive a test data block, and further having an output terminal for outputting output data to said digital switching matrix, for selectively outputting said data stream and said test data block in a first predetermined time slot in response to a select control signal, said first predetermined time slot corresponding to the time slot associated with said transmitting port;

(b) first comparator means for comparing a first input signal to a second input signal, said first input signal indicating a commanded transmit time slot and said second input signal indicating a time slot corresponding to the time slot of the data stream, the data from each port being allocated a predetermined time slot within the data stream, to output said select control signal when said first input signal is equal to said second input signal;

(c) second comparator means for comparing a third input signal to said second input signal, said third input signal indicating a commanded receive time slot which corresponds to a time slot of the receiving port, to output an enable signal when said third input signal is equal to said second input signal; and (d) examining means having an enable terminal adapted to receive said enable signal, for extracting said test data block from said data stream to examine the test data block received by the I/O means associated with said receiving port in response to said enable signal thereby determining whether the test data block has been received error-free thereby verifying said data path.

7. A method for verifying a data path between a transmitting port and a receiving port in a digital transmission system, wherein the digital transmission system includes a plurality of input/output (I/O) means for receiving digital input data from a plurality of ports and transmitting digital output data to a plurality of ports, each I/O means having a predetermined number of ports associated therewith, each port of the digital transmission system having a unique identifier, wherein a first port of said digital transmission system communicates with a second port said digital transmission system via a data path through the digital transmission system, the first port being designated a transmitting port and the second port being designated a receiving port, the data path including a digital switching matrix and the I/O means associated with the transmitting port and the I/O means associated with the receiving port, each I/O means being operatively connected to said digital switching matrix, wherein the digital switching matrix includes a plurality of primary digital switch means and a standby digital switch means, each primary digital switch means being associated with a corresponding I/O means and said standby digital switch means capable of being switched from any one of said primary digital switch means in response to a switch control signal, each I/O means including apparatus for verifying the data path between the transmitting port and the receiving port, said method comprising the steps of:

(a) selecting a transmitting port and receiving port for verifying the data path therebetween;

(b) determining whether said transmitting port and said receiving port included in the data path to be verified are inactive, and if both transmitting port and receiving port included in the data path to be verified are inactive proceeding to step (d);

(c) switching the primary digital switch means, associated with the transmitting port or the receiving port included in the data path to be verified which has been determined to be active, to the standby digital switch means, and proceeding to step (d), however, if both the transmitting port and the receiving port included in the data path to be verified are determined to be active proceeding to step (g);

(d) transmitting a test data block in a first predetermined time slot, said first predetermined test slot corresponding to the time slot associated with said transmitting port;

(e) receiving said test data block in a second predetermined time slot, said second predetermined time slot corresponding to the time slot associated with said receiving port;

(f) examining the received test data block to determine that the test data block has been transmitted error-free thereby verifying said data path; and (g) selecting a combination of transmitting port and receiving port which have not been selected yet, and proceeding to step (b), and if all combinations of transmitting port and receiving port have been selected proceeding to step (a).

* * * * *